June 17, 1952     G. W. PONTIUS, III     2,601,003
GEAR PUMP
Filed May 17, 1946     2 SHEETS—SHEET 2
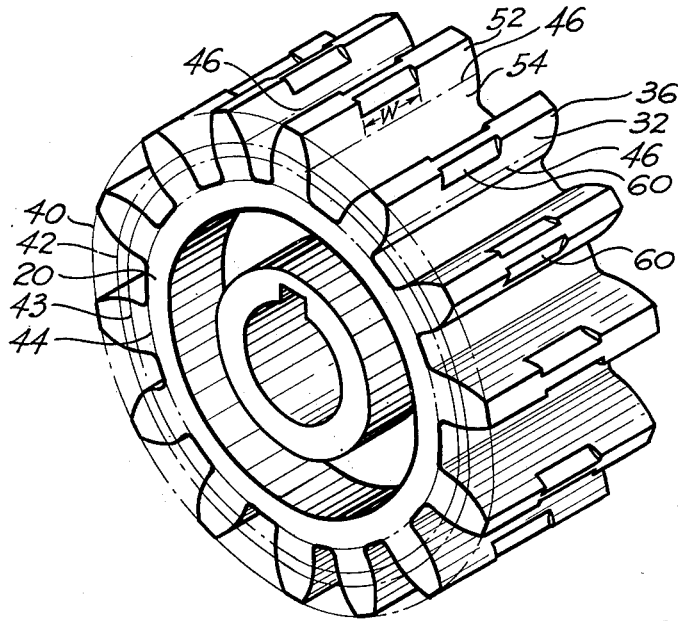
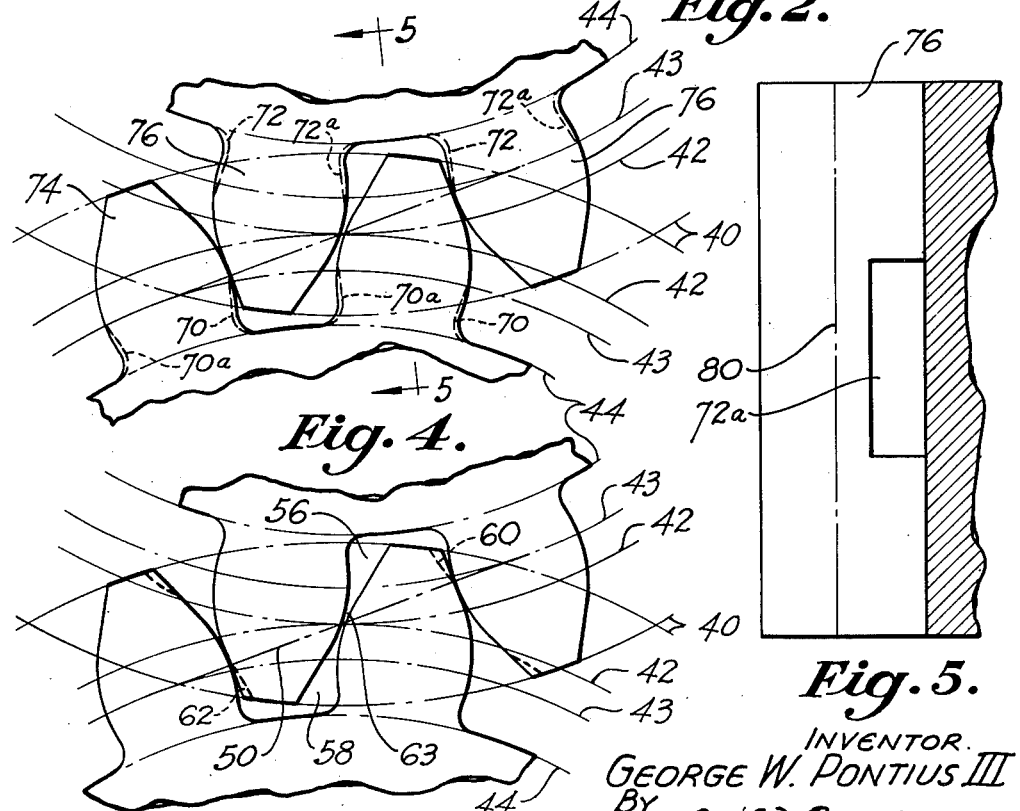
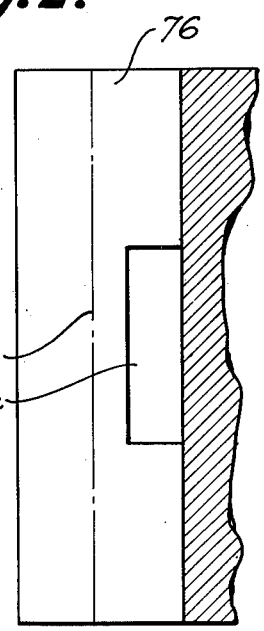
INVENTOR.
GEORGE W. PONTIUS III
BY Cecil J. Arens
ATTORNEY.

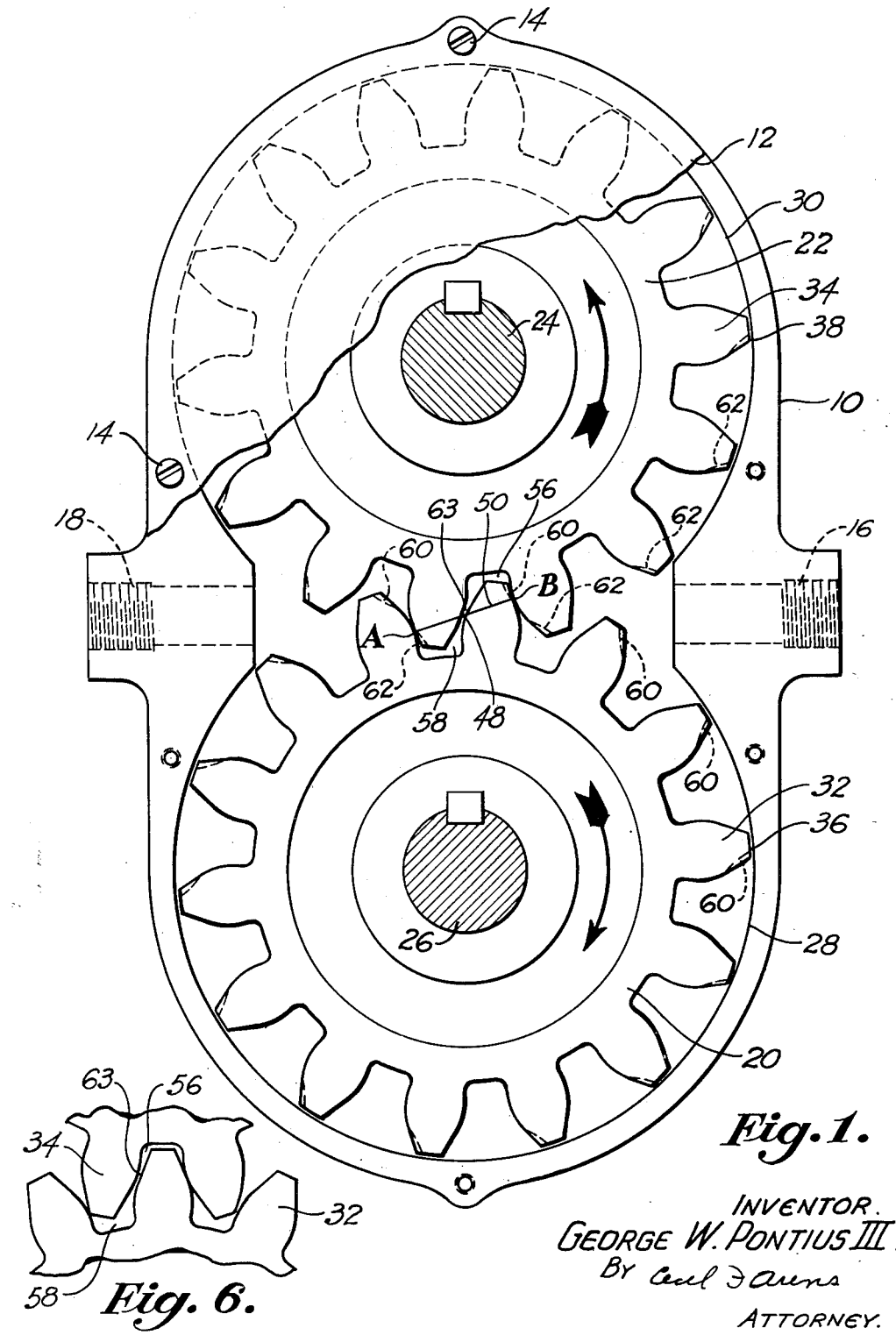

Patented June 17, 1952

2,601,003

UNITED STATES PATENT OFFICE 2,601,003

GEAR PUMP

George W. Pontius, III, South Bend, Ind., assignor to Bendix Aviation Corporation, South Bend, Ind., a corporation of Delaware Application May 17, 1946, Serial No. 670,452

10 Claims. (Cl. 103—126)

This invention relates to improvements in gear pumps.

Since the advent of the gear pump there has always been the problem of trapping fluid between the meshing teeth of the gears. Fluid trapped between the teeth adversely affects the mechanical efficiency and pump life. Various ways have been proposed for releasing this trapped fluid but all seem to have some objectionable feature which renders the pump impractical and/or expensive. Not a few of the attempts at relieving the entrapped fluid have resulted in a loss of volumetric efficiency without having accomplished the primary objective of adequately relieving high trapping pressures.

It is, therefore, an object of this invention to provide a gear pump which has its teeth formed to allow the escape of fluid confined between teeth which are in meshing relationship.

A further important object of the invention resides in the provision of a gear pump, the teeth of which have grooves in their faces extending from the addendum circle to a point in their faces where the line of action intersects the tooth faces when two mating tooth surfaces have their pitch lines substantially co-extensive at the pitch point.

A yet more important object of the invention resides in the provision of a gear pump, the teeth of which have cutout portions in the exterior surfaces thereof to provide escape means for fluid confined between teeth in mesh.

A still further important object of the invention resides in the provision of a gear pump equipped with means for communicating the space between teeth in mesh to either the outlet or the inlet at all times.

Another important object of the invention is the provision of a gear pump, the teeth of which have their surfaces constituted to provide an escape for fluid between teeth in mesh.

The above and other objects and features of the invention will be apparent from the following description of the device taken in connection with the accompanying drawings which form a part of this specification and in which:

Figure 1 is a top plan view of one form of gear pump incorporating the invention;

Figure 2 is an isometric view of one of the gears of the pump;

Figure 3 is an enlarged view of the two gears in meshing relationship with portions broken away;

Figure 4 is an enlarged view of parts of two gears utilizing a modified form of the invention;

Figure 5 is taken on the line 5—5 in Figure 4 showing a view of one of the teeth; and Figure 6 is a view of the two gears of Figure 1 with portions removed, and showing the relationship of the teeth at their initial stage of mesh.

Referring now to Figure 1, reference numeral 10 designates a pump housing or body having a cover 12 mounted thereon by screws 14. The body is provided with an inlet 16 and an outlet 18. A driving gear 20 is rotatably disposed within the body in meshing relationship to a gear 22. The latter gear is keyed to a shaft 24 which is carried by the body. The driving gear 20 is keyed to a shaft 26 and constructed and arranged to rotate the gears. The interior of the pump body or housing is formed at 28 and 30 to cooperate with the gears 20 and 22 for conveying fluid from the inlet 16 to the outlet 18 where the fluid is put under pressure. The driving gear 20 is considered to rotate in a clockwise direction as illustrated in Figure 1 by the direction of the arrow.

The gears 20 and 22 are of the spur gear type with teeth 32 and 34 having tips 36 and 38 respectively. Referring now to Figures 1 and 2, these gears are comprised of an addendum circle 40, a pitch circle 42, base circle 43, dedendum circle 44, pitch line 46, pitch point 48 and a line of action 50. The tooth surfaces of the respective teeth are located between the addendum and dedendum circles and are divided by the pitch lines 46 into tooth faces 52 and tooth flanks 54.

Fluid is received at the inlet by the gear teeth and carried to the outlet in a manner familiar to those skilled in the art. To prevent the entrapment of fluid in pockets 56 and 58 formed between meshing teeth 32 and 34 the leading faces of the teeth 32 are slotted or channelled at 60, and the trailing faces of teeth 34 are channelled at 62 as best shown in Figures 1 to 3. Backlash, designated at 63, is formed between contiguous faces of the meshing gears and provides communication between the pockets 56 and 58 which actually move as the gears rotate. Backlash may be obtained in any suitable manner familiar to those skilled in the art. In actual practice the slots or channels would be formed in both faces of a gear tooth to permit operation of the pump in either direction. See Figure 2.

These channels are disposed in the tooth faces so that when the teeth 32 and 34 move into contact, the fluid confined in the space or pockets 56 and 58 between the teeth is allowed to escape. See Figure 6. It is obvious that if an escape of some kind is not provided for this confined fluid the gear teeth would tend to compress the substantially non-compressible fluid, such as oil, which in all probabilities would result in pump destruction. That is, at the time of initial contact between teeth 32 and 34 (see Figure 6) pocket 56 is smaller in volume than the pocket 58. As the driving gear 20 rotates the driven gear 22 the pocket 56 increases in volume and pocket 58 decreases in volume but the rate of decrease in volume of the latter pocket is greater than the rate of increase in volume of the former pocket until a predetermined position of rotation of the teeth is reached, whereby there is a tendency to put the confined or entrapped fluid under pressure.

If these channels are not properly and accurately located in the teeth faces mal-function of the pump is inevitable. For optimum pump operation it has been found that the channels 60 and 62 must be of a definite length. The length, of course, varies with gear size and construction. The width W of the channels should be such as to allow a reasonable flow velocity of fluid from the pockets. It should be noted that the width W of the channels is always less than the tooth width in order to provide driving contact in all positions of meshing teeth. When teeth 32 and 34 are in contact at predetermined points A and B along their surfaces the length of the channels 60 and 62 is equal to the distance from the points of contact of said teeth to the addendum circle. The points A and B are located by the intersection of the line of action with the points of tangency between the driving and driven teeth of gears 20 and 22 respectively. That is, stating it another way, the location of the channels is determined as follows: When two mating tooth surfaces have their pitch lines substantially coextensive at the pitch point, tooth faces are channelled or otherwise exteriorly relieved from the addendum circles to points where the line of action intersects the tooth faces.

It should be noted that when the line of action 50 passes through points A and B as aforementioned pockets 56 and 58 are substantially of the same volume. When contact between gear teeth 32 and 34 was first made pocket 58 was larger in volume than pocket 56. See Figure 6. In the position shown in Figures 1 and 3 the pockets 56 and 58 have just closed to outlet by reason of the contact between the tooth faces across the entire tooth width to thereby close the passage or channel 62. Likewise, channel 60 is also closed at this instant. A slight amount of rotation of gear 20 will open the passage 60 to communicate the pockets with the inlet. Continued rotation of the driving gear, beyond where the line of action passes through points A and B, will cause pocket 58 to decrease in volume but at a rate slower than the increase in volume of pocket 56 to thereby tend to create a low pressure or vacuum in the pocket or chamber 56, which low pressure is conducive to gear chatter. However, as aforementioned this condition is avoided by providing a channel or passage 60 which communicates pocket 56 with the inlet 16 substantially simultaneously with the sealing of the chamber or pocket 58 from the outlet 18 as best shown in Figures 1 and 3. To illustrate the criticalness of location and size of these passages it will be well to point out that if the channels are too long there will be leakage from the outlet to the inlet whereby the volumetric efficiency of the pump will be reduced and if too short high pressures will be developed within the pockets between the gears.

It should be emphasized that a gear pump incorporating the features of this invention has a relatively higher efficiency.

Figure 4 is a modified form of the invention and is adapted to function in much the same manner as the preferred embodiment of Figures 1 to 3. Instead of the tooth faces being grooved as hereinbefore described, the tooth flanks are grooved at 70 and 72 of teeth 74 and 76 respectively. To permit use of the pump in either direction of rotation both flanks of a tooth are channelled. However, for clockwise rotation, only channels 70 and 72 will be needed. For counter-clockwise rotation channels 70a and 72a are used. When two mating tooth surfaces have their pitch lines substantially coextensive at the pitch point tooth flanks are channelled from a predetermined point below the base circles to a point in the tooth flanks where the line of action intersects the tooth flanks to thereby provide an escape for the entrapped fluid. The pitch line is designated by the numeral 80 in Figure 5.

Although the invention has been described in connection with certain specific embodiments the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a fluid pump or motor, a body having inlet and outlet ports, a driving gear located in the body, a driven gear, said driving and driven gears having teeth in mesh with faces in contact relationship and backlash therebetween, said teeth in mesh forming pockets therebetween in which fluid is entrapped, and a channel in the leading tooth faces of each of the teeth of the driving gear and in the trailing tooth faces of each of the teeth of the driven gear extending along the tooth faces from the addendum circles of the gears to a point in the tooth faces intersected by the line of action at a time when the pitch lines of two mating gear teeth pass through the pitch point.

2. The method of locating channels in the tooth faces of mating gears having backlash therebetween to provide a means of escape for fluid entrapped between the teeth in mesh, the steps of which comprise placing the gear teeth in engaging relationship so that two mating tooth surfaces have their pitch lines substantially coextensive at the pitch point, and locating a channel in the leading tooth face of one of the gears and in the trailing tooth face of the other gear so that said channel will extend along the tooth faces from a point in the tooth faces where the line of action intersects said tooth faces to the addendum circles of the respective gears.

3. In a fluid pump or motor, a body having an inlet and an outlet, driving and driven gears disposed within the body with backlash therebetween, said gears having teeth with surfaces in contact when the gears are in meshing relationship, the teeth in mesh having pockets formed therebetween in which fluid is entrapped, and a channel in the flanks of the leading tooth surfaces of each of the teeth of the driving gear and in the flanks of the trailing tooth surfaces of each of the teeth of the driven gear extending from a predetermined point below the base circles of the gears to a point where the line of action intersects the tooth flanks when the two mating tooth surfaces have their pitch lines substantially coextensive at the pitch point.

4. A fluid pump or motor comprising a body having inlet and outlet ports, a pair of gears located in the body in meshing relationship and having backlash therebetween, said meshing gears constructed and arranged to form two moving pockets between the teeth in mesh and having variable volumes which entrap fluid, the increase in volume of one of the pockets being at a slower rate than the decrease in volume of the other pocket, whereby the entrapped fluid in said one pocket tends to be subjected to a decreasing pressure and the entrapped fluid in said other pocket tends to be subjected to an increasing pressure, and means providing an escape for the entrapped fluid from the pockets comprising a passage in the trailing tooth faces of the teeth of one of said gears and in the leading tooth faces of the teeth of the other gear, said passage extending from the addendum circles of said gears to a point in the tooth faces of said gears intersected by the line of action at a time when the pitch lines of two mating gear teeth pass through the pitch point.

5. A fluid pump or motor comprising a body having inlet and outlet ports, a pair of gears located in the body with the teeth of said gears meshing in such a manner as to provide backlash therebetween, said meshing teeth constructed and arranged to form two moving pockets between the teeth in mesh having variable volumes which entrap fluid, the increase in volume of one of the pockets being at a slower rate than the decrease in volume of the other pocket, whereby the entrapped fluid in said one pocket tends to be subjected to a decreasing pressure and the entrapped fluid in said other pocket tends to be subjected to an increasing pressure, and means providing an escape for the entrapped fluid from the pockets comprising a passage in the leading tooth faces of each of the teeth of one of the gears and in the trailing tooth faces of each of the teeth of the other gear, said passage extending from the addendum circles of the gears to a point in the tooth faces intersected by the line of action at a time when the pitch lines of two mating gear teeth pass through the pitch point, whereby said other pocket is communicated to outlet to expel the entrapped fluid thereto and said one pocket is communicated to inlet to equalize the pressure therein after communication with the outlet is cut off.

6. In a fluid pump or motor, a body having inlet and outlet ports, a pair of gears located in the body in meshing relationship, said gears having backlash, with the teeth in mesh forming moving pockets therebetween in which fluid is entrapped, and a relief in the trailing tooth faces of one of the gears and in the leading tooth faces of the other gear, said relief extending from the addendum circles of said gears to a point in the tooth face of said gears intersected by the line of action at a time when the pitch lines of two mating gear teeth are substantially coextensive at the pitch point.

7. In a fluid pump or motor, a body having inlet and outlet ports, driving and driven gears in the body arranged in meshing relationship, with the teeth in mesh forming pockets therebetween in which fluid is entrapped, said gears having backlash therebetween, and a channel in the leading tooth faces of each of the teeth of the driving gear and in the trailing tooth faces of each of the teeth of the driven gear extending along the tooth faces from the tooth tips of the gears to a line in the tooth faces normal to and intersecting the line of action at a time when the pitch lines of two mating gear teeth pass through the pitch point.

8. In a fluid pump or motor, a body having inlet and outlet ports, driving and driven gears in the body arranged in meshing relationship, with the teeth in mesh forming pockets therebetween in which fluid is entrapped, said gears having backlash therebetween, and a channel in the leading tooth faces of each of the teeth of one of the gears and in the trailing tooth faces of each of the teeth of the other gear extending along the tooth faces from the tooth tips of the gears to a line in the tooth faces normal to and intersecting the line of action at a time when the pitch lines of two mating gear teeth pass through the pitch point.

9. In a fluid pump or motor, inlet and outlet ports, a pair of gears arranged in meshing relationship with the teeth in mesh forming two pockets therebetween in which fluid is entrapped, said gears having backlash, and a channel in the leading tooth surfaces of each of the teeth of one of the gears and in the trailing tooth surfaces of each of the teeth of the other gear, each of said channels of one of said gears having one of its ends located in the surface at a predetermined point so as to communicate one of the pockets with one of the ports before the pitch lines of the two mating gear teeth forming the pockets are coextensive and each of said channels of the other gear having one of its ends located in the surface at a predetermined point so as to communicate the other pocket with the other port after said pitch lines are coextensive, the other end of each of said channels being located in the surface at a point where the line of action intersects the tooth surfaces when two mating tooth surfaces have their pitch lines coextensive at the pitch point.

10. In a fluid pump or motor, driving and driven gears arranged in meshing relationship with the teeth in mesh forming pockets therebetween in which fluid is entrapped, said gears having blacklash, and a channel in the flanks of the leading tooth surfaces of each of the teeth of one of the gears and in the flanks of the trailing tooth surfaces of each of the teeth of the other gear extending along the tooth flanks from a predetermined location therein below the base circles of the gears to a point where the line of action intersects the tooth flanks when two mating tooth surfaces have their pitch lines substantially coextensive at the pitch point.

GEORGE W. PONTIUS, III.

REFERENCES CITED

The following references are of record in the file of this patent:

UNITED STATES PATENTS

| Number | Name | Date |
|---|---|---|
| 884,812 | Gillmor et al. | Apr. 14, 1908 |
| 1,252,160 | Pagel | Jan. 1, 1918 |
| 1,633,793 | Porst | June 28, 1927 |
| 1,686,867 | Kuhn | Oct. 9, 1928 |
| 1,712,095 | Schurr | May 7, 1929 |
| 1,728,529 | Butler | Sept. 17, 1929 |
| 1,813,875 | Fehr | July 7, 1931 |
| 1,923,268 | Jensen | Aug. 22, 1933 |
| 1,976,227 | Howard | Oct. 9, 1934 |
| 2,159,744 | Maglott | May 23, 1939 |
| 2,344,628 | Monahan | Mar. 21, 1944 |

FOREIGN PATENTS

| Number | Country | Date |
|---|---|---|
| 439,908 | Great Britain | Dec. 17, 1935 |